Nov. 24, 1959  G. R. HARTING  2,914,156
ELECTROMAGNETIC CLUTCH OR BRAKE
Filed Nov. 19, 1956
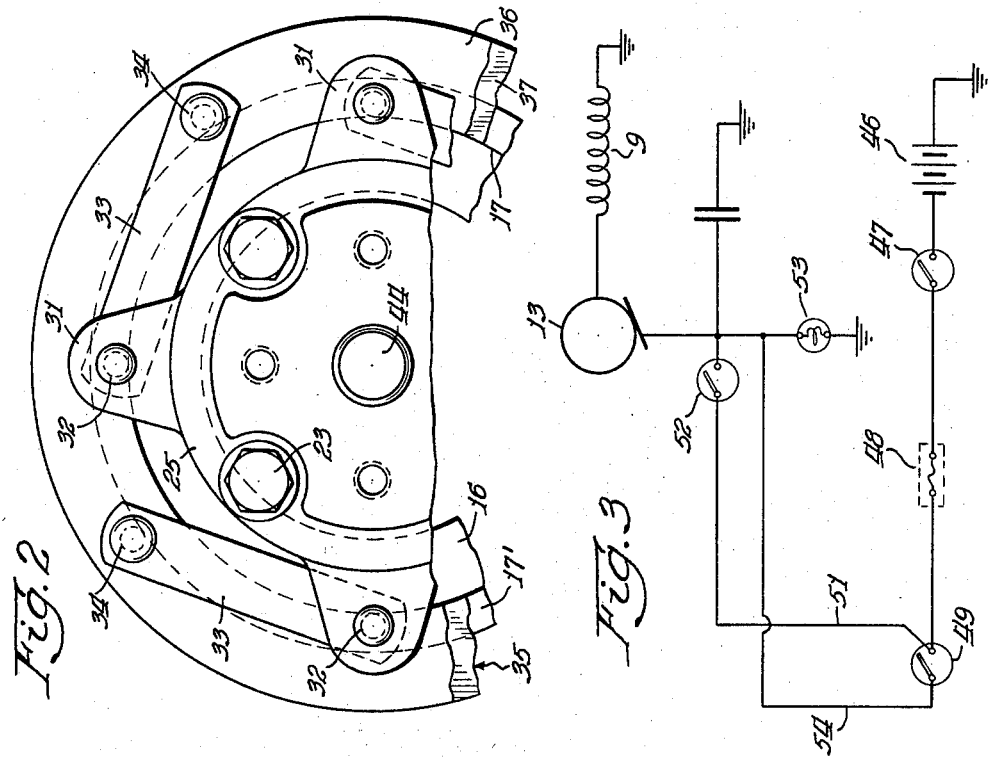
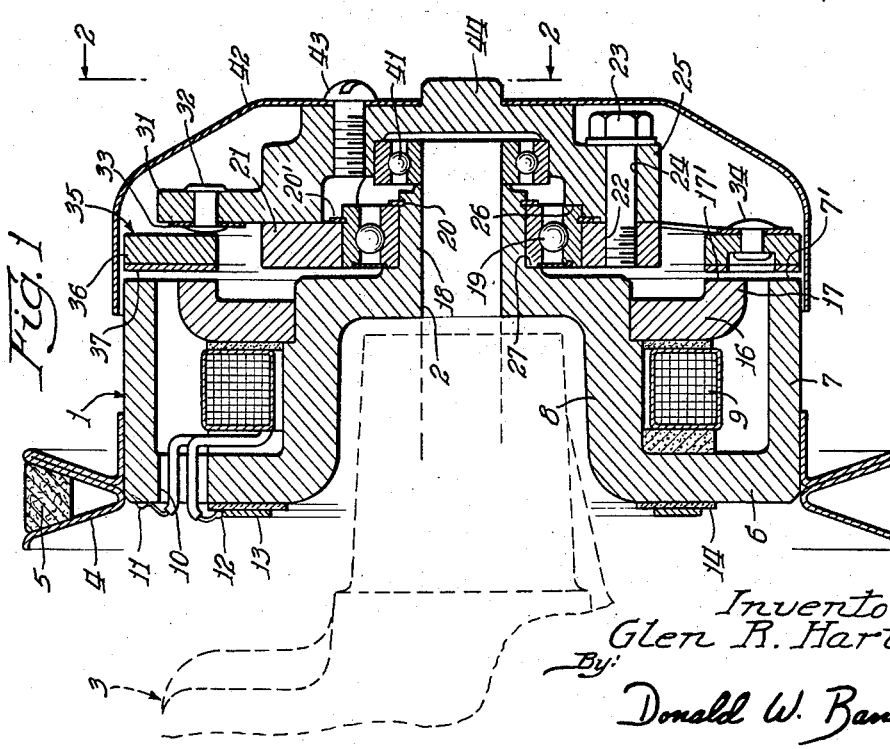
Inventor:
Glen R. Harting
By: Donald W. Banner, Atty.

United States Patent Office 2,914,156
Patented Nov. 24, 1959

2,914,156

ELECTROMAGNETIC CLUTCH OR BRAKE

Glen Robert Harting. Rockford, Ill., assignor to Borg-Warner Corporation, Chicago, Ill., a corporation of Illinois Application November 19, 1956, Serial No. 623,062

2 Claims. (Cl. 192—84)

The present invention relates to electromagnetic clutch devices.

In electromagnetic clutch devices it is advantageous to employ energizing coils having the smallest possible diameter so as to utilize as little copper, or other coil material, as possible. This would obviously result in a substantial saving in the relatively expensive coil forming material. On the other hand, it is advantageous in friction clutches to employ friction surfaces having the largest mean diameter as is practicable to increase the torque carrying capacity of the structure.

One object of the present invention is the provision of a new and improved electromagnetic type clutch employing a relatively small diameter electromagnetic coil together with a relatively large mean diameter friction clutching surface associated therewith.

Another object of the present invention is the provision of a device in accordance with the preceding object in which the friction clutch employs a magnetically permeable friction material.

Another object of the present invention is to produce devices in accordance with the preceding objects in which a flux path is employed which includes a section of magnetically permeable material extending radially outwardly from the coil, and which serves as one of the surfaces of the friction clutch.

Other objects and features of the invention will be readily apparent to those skilled in the art from the specification and appended drawings illustrating certain preferred embodiments in which:

Figure 1 is a longitudinal sectional view through a device incorporating the principles of the present invention;

Figure 2 is a sectional view along the plane of line 2—2 of Figure 1 with parts broken away to facilitate the illustration of the device;

Figure 3 is a schematic electrical circuit diagram illustrating an electrical circuit in which the device of the present invention may be employed.

As illustrated in the drawings, the present invention is adapted for utilization in a clutch associated with a fan and water pump in an automotive vehicle; it should be understood, however, that the invention is not limited to such use. In the figures, there is illustrated a generally annular body 1 of electromagnetic material having a central aperture 2 adapted to be press fit onto the driving shaft of a water pump 3, shown in dotted outline. To the body 1 there is fixedly attached a pulley 4 adapted to be driven constantly by a fan belt 5 whenever the engine of the vehicle is in operation. It will be seen that the relationship between the body 1 and the water pump 3 is such that when the pulley is rotated by the fan belt, the water pump will be continuously driven. As best illustrated in Figure 1, the body 1 is formed to have a rear wall 6 which connects an annular outer portion 7 having a forwardly facing surface 7' to annular inner portion 8 of body 1, which project forwardly from the annular rear wall 6. Surrounding the annular inner portion 8 of the body 1 is an electromagnetic coil 9 formed of a plurality of turns of conducting material, such as copper, of the usual form. Suitable spacers and insulating means are provided, as shown in Figure 1, or the coil may be embedded in an insulating wax in accordance with common practice. It should be noted that the rear wall 6 of the body 1 is provided with a small opening 10 in which there is disposed an insulating bushing, through which the two leads to the coil 9 extend. One of the leads from the coil 9 is soldered at 11 to the magnet body 1, which acts as a ground, while the other lead is soldered at 12 to an annular collector ring 13 of conducting material. The ring 13 is bonded to an annular insulator ring 14 which, in turn, is bonded to the rear wall 6 of the body 1.

Also mounted on the annular portion 8 of the body 1 is an adaptor 16 of magnetically permeable material such as SAE 1020 steel which is generally annular in shape and which is provided with a central circular opening therein which is press fit onto the portion 8 of the body 1, as illustrated in Figure 1. When so positioned, adaptor 16 aids in retaining coil 9 in position. It should be noted that the adaptor 16 has an outer annular flange portion 17 with a forwardly facing surface 17' coplanar with the annular surface 7' and which serves as a friction surface, as will be subsequently explained. It should be noted at this time, however, that the forwardly facing surface 17', as well as the forwardly facing surface 7', have relatively large radial extent so as to provide relatively large facing areas.

As best illustrated in Figure 1, the central portion of the body 1 comprises an annular, forwardly extending portion 18 which defines the previously described annular opening 2; mounted upon this portion 18 is the inner race of a bearing 19, held against forward movement relative to portion 18 by a snap ring 20 disposed within a suitable groove in portion 18. Upon the outer race of the bearing 19 there is disposed a ring 21 held against forward movement on this outer race by a suitable snap ring 20' mounted in a groove in this outer race. The ring 21 is provided with a plurality of circumferentially spaced threaded openings 22, each of which receives the threaded end of a cap screw 23. The cap screws 23 extend through suitable openings 24 in an annular hub 25, the head of the cap screws 23 engaging the forward face of the hub 25. It should be noted that the hub 25 is provided with an annular, rearwardly facing, radially extending edge 26 disposed in engagement with the outer race of the bearing 19; that the inner race of bearing 19 is confined by the snap ring 20 and a forwardly facing, radially extending annular edge 27 formed integral with the body; that the ring 21 is prevented from forward movement by the snap ring 20'; the net result of these relationships being that the hub 25 is rigidly held against axial movement.

The hub 25 is provided with a plurality of circumferentially spaced lugs 31 projecting radially outwardly therefrom to each of which is attached, by rivet means 32, one end of a steel strap 33, the opposite end of each strap 33 being attached by rivet means 34 to an annular armature 35. The armature 35 comprises a steel (or other suitable magnetically permeable material) backing portion 36 having a friction material face 37 bonded thereto, the friction material 37 having a high coefficient of friction and being composed of a magnetically permeable material. For example this friction facing may comprise powdered iron; one commercial product suitable for use as such a friction material is sold by the S. K. Wellman Company under the designation 83A. It is significant to note at this time that the mean diameter of the friction facing 37 is relatively large, and substantially larger than the mean diameter of the coil 9.

As best illustrated in Figure 1, there is provided between the hub 25 and the forwardmost portion of the water pump shaft bearing means 41, and that surrounding the forward portion of the clutch device is a dust shield 42 of generally cup-shape which is mounted to the hub 25 by means of studs 43 engaged with suitable threaded holes provided in the hub 25. The cover 42 has a central circular opening through which a pilot 44 for the fan (not shown) to be utilized with the device projects, the pilot 44 being integral with the hub 25. The studs 43 may be used to secure the fan to the hub 25.

The electrical circuit with which the device of the present invention may be utilized is illustrated in Figure 3. The source of energy in Figure 3 is schematically illustrated as a battery 46 connected through an ignition switch 47 and a suitable circuit protecting fuse 48 to a manual operable switch 49. To one terminal of the switch 49 is connected a conductor 51, the opposite end of which is connected to one terminal of a thermostatic switch 52 of conventional construction which may be responsive to the temperature of the coolant of the vehicle in which the device of the present invention is installed. From the switch 52 there are three paths to ground; one of these comprises an indicator light 53 and another includes brush holders and slip ring 13 previously described which are, of course, in series with the coil 9 for energizing the clutch. It will be seen that when 9 for energizing the clutch. It will be seen that when the ignition switch 47 is closed and the manually operated switch 49 is open, the energization of the coil 9 is dependent upon the closure of the thermostatic switch 52. It will also be seen that the indicator light 53 will operate whenever the thermostatic switch 52 closes. As a result the device may be automatically operated in response to the temperature of the engine coolant, so that when this coolant temperature is sufficiently high the switch 52 will operate to energize the clutch and drive the fan; when the temperature of the coolant drops sufficiently the switch 52 will open and the coil 9 will be de-energized so that the clutch will not drive the fan. On the other hand, when the manually operated switch 49 is closed, a conductor 54, in parallel with the switch 52, will carry current from the battery to coil 9 and light 53 so that the coil 9 will be continually energized as long as the ignition switch 47 is closed; the fan controlled by the clutch will then be continuously driven.

The normal, nondriving condition of the device is illustrated in Figure 1. The coil 9 is deenergized and the armature 35 is spaced from face 17' on the adaptor 16 and the face 7' on the body 1, armature 35 being biased to the position illustrated in Figure 1 by the straps 33. When the fan belt 5 is driven by the engine, the body 1 will rotate with it to drive the water pump shaft continuously, while the hub 25, the armature 36, the ring 21 and the cover 42 will "windmill" without driving the fan connected to the hub 25. When the coil 9 is energized, however, electromagnetic flux will pass through the portions 7 and 8 of the body 1, the adaptor 16, and through the friction facing 17 into the armature 36. When this occurs the armature 36 will be attracted to the body 1 against the bias of straps 33, the friction facing 37 engaging the body face 7' and the face 17' on the adaptor 16. Rotative forces are therefore transmitted from the body 1 to the armature 36, through the frictional engagement between facing 37 and the faces 7' and 17', through the straps 33 to the hub 25, and from the hub 25 to the fan connected thereto. This driving condition will continue as long as the coil 9 remains in energized condition. When the coil 9 is deenergized, the straps 33 will effect movement of the armature 36 back into the position illustrated in Figure 1 in which the drive from the body 1 to the hub 25 is interrupted.

It is particularly important to notice that in effecting this energization the lines of flux emanating from the energized coil 9 will pass through the portion 8 of the body and be transmitted radially outwardly through the adaptor 16 to a position which is substantially radially outwardly of the mean diameter of the coil 9. It is also very important to notice that the area of the face 17' on the adaptor 16 and the area of the face 7' of the body 1 are quite large, and are chosen to have substantial area to contact the friction material 37 so that grooves will not be worn in this friction material and the wear-life characteristics of the device are increased. This relatively large area of face 7' and of face 17' also ensures that the flux density in these facings is sufficiently small so that magnetic losses in the magnetic circuit are relatively small.

It will be seen that the adaptor 16 permits the utilization of a relatively small coil, the flux emanating therefrom passing radially outwardly to a more desirable position adjacent a relatively large diameter friction member. As a result of this arrangement, the mean diameter of the friction member used in the clutch may be very large, so that the torque capacity of the clutch is quite great, while the mean radius of the coil is very small, and the cost of the coil minimized.

It will therefore be seen that the present invention provides for a clutch (or brake) having friction surfaces of relatively large mean diameter which means that the device can transmit (or retard) a substantial torque load. Accompanying this advantage is the extremely desirable feature inherent in this invention permitting use of an electromagnetic energizing coil which is relatively small in diameter, being much smaller in its mean diameter than the mean diameter of the friction surfaces; this is made possible by the provision of an adaptor which conveys the electromagnetic flux from the small coil radially outwardly to a position adjacent the relatively large diameter friction member.

While the present invention has been described as used in an automotive vehicle to drive a fan for the vehicle, it will be readily apparent to those skilled in the art that the invention is not limited to such applications. It should also be understood that the electrical diagram described herein is for the purposes of illustration only, and the device is not limited to utilization with such circuit. Furthermore, while the invention is described as incorporated in a clutch mechanism, it is equally usable in a brake mechanism.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

I claim:

1. In a magnetically operating friction device, the combination comprising a body of magnetically permeable material generally annular in configuration which comprises an axially extending outer portion having a radially extending face, an axially extending inner annular portion and a radially extending portion integrally formed with said outer portion and said inner portion and maintaining said outer portion and said inner portion in radially spaced relation, an annular electromagnetic coil carried by said inner annular portion of said body, an armature of magnetically permeable material having an annular magnetically permeable friction face thereon of mean diameter greater than the mean diameter of said coil, means mounting said armature for rotation relative to said body including a hub connected to said armature by resilient straps effective to bias said armature away from said body, and magnetically permeable annular adaptor means L-shaped in cross section fixedly mounted to said body inner portion between said coil and said armature extending from said inner portion radially outwardly beyond said coil and terminating in a radially extending face in radial alignment with said first mentioned face and in axial alignment with said armature friction face, said friction face extending radially so as to be in axial alignment with said first-mentioned face and with the radially extending face of said adapter means; whereby energization of said coil effects the flow of magnetic flux through said annular outer and inner portions of said body, said adaptor, said friction facing and said armature to effect movement of said armature against the bias of said straps to effect engagement of said friction facing thereon with said two aforementioned faces to provide a frictional connection between said body and armature.

2. In a magnetically operating friction device, the combination comprising a body of magnetically permeable material generally annular in configuration which comprises an axially extending outer portion having a radially extending face and an axially extending inner annular portion, an annular electromagnetic coil carried by said inner annular portion of said body, an armature of magnetically permeable material having an annular magnetically permeable friction face thereon of mean diameter greater than the mean diameter of said coil, means mounting said armature for rotation relative to said body including a hub having a plurality of circumferentially spaced lugs, a deflectable resilient strap connecting each of said lugs to said armature, said straps being effective to bias said armature away from said body, and magnetically permeable annular adaptor means fixedly mounted to said body inner portion between said coil and said armature extending from said inner portion radially outwardly beyond said coil and terminating in a radially extending face in radial alignment with said first mentioned face and in axial alignment with said armature friction surface; whereby energization of said coil effects the flow of magnetic flux through said annular outer and inner portions of said body, said adaptor, said friction facing and said armature to effect movement of said armature against the bias of said straps to effect engagement of said friction facing thereon with said two aforementioned faces to provide a frictional connection between said body and armature.

References Cited in the file of this patent

UNITED STATES PATENTS

| | | |
|---|---|---|
| 882,607 | Anderson | Mar. 24, 1908 |
| 1,479,034 | Fernow | Jan. 1, 1924 |
| 2,351,598 | Cadman | June 20, 1944 |
| 2,738,044 | Winther | Mar. 13, 1956 |
| 2,739,683 | Gamundi | Mar. 27, 1956 |
| 2,796,962 | Pierce | June 25, 1957 |
| 2,796,963 | Harter | June 25, 1957 |

FOREIGN PATENTS

| | | |
|---|---|---|
| 123,446 | Great Britain | Feb. 27, 1919 |
| 37,818 | France | Nov. 18, 1930 |
| 533,180 | Canada | Nov. 13, 1956 |

UNITED STATES PATENT OFFICE
CERTIFICATE OF CORRECTION

Patent No. 2,914,156                                                        November 24, 1959

Glen Robert Harting

It is hereby certified that error appears in the printed specification of the above numbered patent requiring correction and that the said Letters Patent should read as corrected below.

Column 3, lines 27 and 28, strike out "It will be seen that when 9 for energizing the clutch.".

Signed and sealed this 10th day of May 1960.

(SEAL)
Attest:

KARL H. AXLINE
Attesting Officer

ROBERT C. WATSON
Commissioner of Patents